(12) United States Patent
Liebman et al.

(10) Patent No.: US 6,262,503 B1
(45) Date of Patent: Jul. 17, 2001

(54) METHOD AND APPARATUS FOR COOLING CURRENT CARRYING COIL

(75) Inventors: Michael Liebman, Somerville, MA (US); David L. Trumper, Plastow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/173,412

(22) Filed: Oct. 15, 1998

(51) Int. Cl.[7] ............................... H02K 9/19; H02K 9/22
(52) U.S. Cl. ............................... 310/64; 310/12; 310/58; 310/65
(58) Field of Search ............................... 310/12, 52, 54, 310/57, 58, 59, 60 R, 60 A, 64, 65

(56) References Cited

U.S. PATENT DOCUMENTS

| | | | |
|---|---|---|---|
| 4,543,503 | * | 9/1985 | Kaminski et al. ............... 310/59 |
| 5,258,671 | * | 11/1993 | Vollenwyder et al. .......... 310/12 |
| 5,751,077 | * | 5/1998 | Gonzalez ........................ 310/12 |
| 5,955,804 | * | 9/1999 | Kusase et al. .................. 310/59 |

* cited by examiner

*Primary Examiner*—Nestor Ramirez
*Assistant Examiner*—Judson H. Jones
(74) *Attorney, Agent, or Firm*—Wolf, Greenfield & Sacks, P.C.

(57) ABSTRACT

A method and apparatus are provided for cooling a current carrying coil and a specialized coil is provided for use in such method and apparatus. The coil has openings formed therein between at least selected internal wires of the coil in at least one non-working region along the coil. Such openings may for example extend through the coil in a direction substantially perpendicular to the plane of the coil or substantially parallel to such plane. A heat sink is provided in each such opening which heat sink may be a fluid in the opening, which fluid is preferably flowing through the opening. The fluid may be a gas such as air or a liquid such as oil or water. Alternatively, the heat sink may be a comb formed of a material having good heat conduction characteristics, which comb has a plurality of fingers which pass through corresponding openings in a region of a coil and a backbone or block through which heat may be removed from the fingers.

30 Claims, 4 Drawing Sheets

METHOD AND APPARATUS FOR COOLING CURRENT CARRYING COIL

FIELD OF THE INVENTION

This invention relates to current carrying coils such as those used for linear motors and more particularly to a method and apparatus for enhanced cooling of such coils to improve their current carrying capacity, and thus the output which can be obtained from a coil of a given size.

BACKGROUND OF THE INVENTION

Current carrying coils are utilized in a variety of applications, including linear and other motors, generators, electromagnets, transformers and the like. While devices employing such coils (hereinafter sometimes referred to as "coil devices") find extensive use, a limitation on the performance of such devices, and therefore on even more wide-spread use thereof, is thermal limitations resulting from the heat generated when a current flows through an electric coil. This heat must be dissipated effectively so that the coil device does not get excessively hot, such excessive heat resulting in potential destruction of the device. Coil devices are therefore generally rated for the highest continuous current they can withstand while maintaining an acceptable temperature level. This maximum current limits the performance of the device, for example limiting the maximum force obtained from a given motor or the maximum power a transformer can safely handle. Where more force or power is required, either a bigger device with more coils must be used or multiple devices must be employed. In either event, the resulting device will be bulkier, taking up more space in areas where space is frequently at a premium, heavier, which may be a problem in mobile applications, and generally significantly more expensive.

Improved thermal efficiency for devices utilizing current carrying coils thus facilitates an increased output per unit volume of the device. Another advantage of a more thermally efficient coil device is that, for the same current and output, the device will run cooler; and, since the coil resistance increases with temperature, increasing for example approximately 40% for a 100° C. temperature rise, more efficient operation of the coil is obtained at lower temperatures. Insulation materials also degrade faster at high temperature, a rule of thumb being that every 10° C. rise in temperature halves the insulation lifetime. Thus, improved thermal efficiency for a motor, transformer or other current carrying coil device allows for increased power efficiency, increased output/maximum motor force for a given size device, a smaller device for a given output, increased device life, increased machine accuracy (less distortion from thermal expansion) and/or some combination of the above.

Many efforts have heretofore been made to provide cooling for such coil devices. The simplest, and most common, is to let surrounding air freely convect away the heat. Fins may be added to improve this free convection by increasing the surface area exposed to air and further improvement can be achieved by forced convection of air over the coils or fins. Heat has also been conducted away from the coils by heat sinking a thermally conductive core in contact with the windings, by placing the coil in contact with a stationary or flowing fluid, such as air, an inert gas, water or oil, or by other similar techniques.

However, in all of the above schemes, the cooling medium, whether air, some other fluid, or a physical heat sink, only directly contacts the outer-most or inner-most layer of wires in the coil; thus, the heat generated by the many interior layers of the coil can not easily escape, this heat having to travel across multiple layers of the coil before reaching the cooling medium. The thermal resistance across coil layers is often substantial, leading to unacceptably high temperature gradients within the coil. This is at least in part because the air voids which typically exist between layers in a coil are good thermal insulators. While coils are often potted in an epoxy resin to eliminate the air voids, and thus improve heat transfer, such potting also increasing coil strength and the electrical insulation between wires, the thermal resistance of the epoxy, while lower than that for air, is still significant, and this thermal resistance, coupled with that of the insulation layers of the wires themselves, still results in a relatively large thermal resistance between coil layers. Since even a single hot spot in a coil can destroy insulation at that point, and thus destroy the coil, (and frequently the entire coil device), such existing cooling schemes, while an improvement over passive air convection cooling, still leave much to be desired in optimizing the thermal efficiency, and thus the performance, of coil devices.

To overcome the above problems, some large transformers or other large coil devices have used hollow wires through which a cooling medium is flowed. However, this is an expensive cooling technique and has generally only been practical for large machines. Other large machines have provided selective spacing between coil wires, through which spacings a cooling medium may be flowed or into which spacing some heat sink medium may be placed. While such an arrangement can be used in certain large transformer applications, motors and most other coil devices operate far more efficiently when the coils are together rather than when they are separated, so that this approach has not proved practical, and has not generally been utilized, for smaller coil devices, such as those involving linear motors where such loss of efficiency is unacceptable.

An improved method and apparatus for cooling the coils of coil devices in general, and such smaller devices in particular, to improve the thermal efficiency thereof without significant negative impact on the coil device's efficiency is therefore required.

SUMMARY OF THE INVENTION

In accordance with the above, this invention provides a method and apparatus for cooling a current carrying coil having a plurality of wires wrapped in a predetermined shape, which coil has at least one working region and at least one non-working region. The method and apparatus includes providing openings in the coil between at least selected internal wires at at least one non-working region, such openings not being formed in working regions, and utilizing the openings to remove heat from the wires, particularly those adjacent the openings. The heat removal may be accomplished by having a cooling fluid in the openings, including flowing a cooling fluid through the openings at least during periods when current is applied to the coil. The fluid may be a gas such as air or a liquid such as oil or water. A recirculation mechanism is preferably supplied for the liquid, which recirculation mechanism may include a chiller for the liquid. Particularly, where water is being utilized as a cooling fluid, a protective lining may be provided for the openings to at least limit the contact of the liquid with the wires. The openings in the coil may also be formed by loosely or randomly winding the wires at the at least one non-working region. Openings for the embodiments are preferably either substantially perpendicular or substantially parallel to the plane of the coil.

For applications such as a linear motor, the coil may be elongated, having two long side sections connected by two shorter end sections, with a non-working region at which the openings are formed being on either one or both end sections. The number of openings and their positioning at the one or more regions on the coil is preferably such that each wire which is internal to the coil is adjacent at least one of the openings.

For an alternative embodiment of the invention, a comb is formed of a material having good heat conduction characteristics such as copper. The comb has a plurality of fingers, each of which passes through a corresponding opening and preferably includes at least one block or backbone to which the fingers are connected and a heat sink mechanism which removes heat from the block and/or the fingers. For preferred embodiments, the heat sink mechanism is a cooling liquid which is passed through the block. A block may be provided on each side of the corresponding openings, with the fingers being connected to each of the blocks. Alternatively, the fingers may be hollow, with a cooling liquid being passed into one of the blocks, through the fingers, and out through the other block. Each of the fingers may be thermally connected to the block, with the heat sink mechanism removing heat from the block, or the fingers may pass through one side of the block and into one or more channels formed in the block. A mechanism is provided which passes a cooling fluid through the channels and over portions of the fingers extending therein.

The invention also includes the various coils described above which have at least one non-working region with openings formed therein between at least selected wires, which openings may extend through the coil in a direction substantially perpendicular to or parallel to the plan of the coil, or may be formed by loosely or randomly winding the coil at the at least one region. A linear motor utilizing the cooled coils is also included within the invention.

The foregoing and other objects, features and advantages of the invention will be apparent from the following, more particular description of preferred embodiments of the invention as illustrated in the accompanying drawings.

IN THE DRAWINGS

DETAILED DESCRIPTION

Figure 1A:
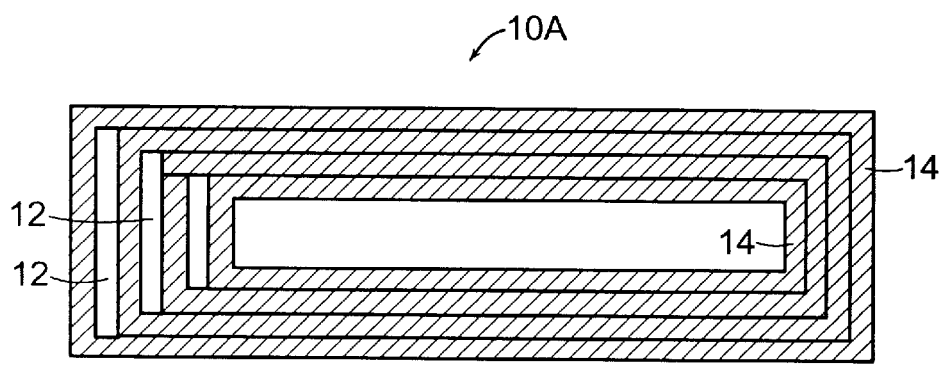
FIGS. 1A and 1B are top views of coils having openings on one side (i.e. at one region) thereof and on two sides or regions thereof respectively for a first embodiment of the invention.
Figure 1B:
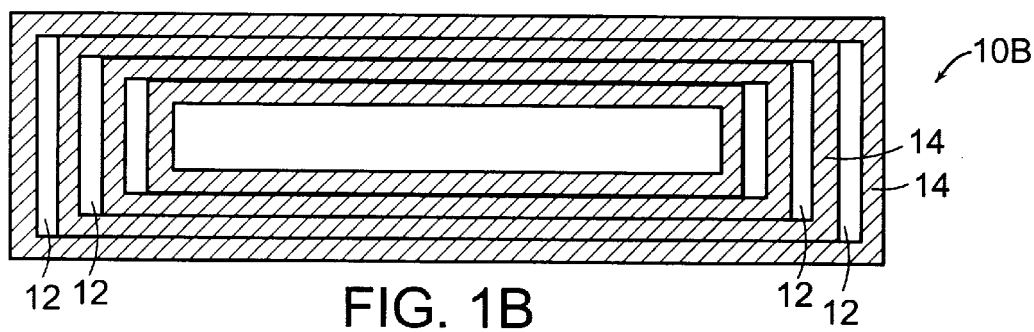

Referring first to FIGS. 1A and 1B, it is seen that this invention overcomes the inability of prior art systems to cool windings at the interior of a coil by separating or providing a spacing between the windings at least one point or region 16 along the coil, which point 16 is in a non-working region of the coil. For example, where coil 10 is being used in a linear motor, the elongated middle portion of the coil might overlie or be between magnets of the linear motor, while ends of the coil containing region or regions 16 extending beyond the magnets do not substantially contribute to the operation of the motor. In particular, the coils 10A and 10B shown in FIGS. 1A and 1B respectively, have openings 12 formed between select ones of their windings 14. Coil 10A differs from coil 10B in that coil 10A has openings 12 at only one region 16 on the coil, namely on the left side, while coil 10B has openings at two regions 16A and 16B along the coil, the openings being on both sides. The openings 12 may be utilized in a variety of ways, some of which are discussed hereinafter, to cool the individual windings 14 of the coil, including windings 14 at the interior of the coil. While for the embodiments shown in FIGS. 1A and 1B, there is an opening 12 on each side of each winding 14, in order to keep the size of the coil from becoming excessively large, for larger coils it may be preferable that there be two windings between each of the openings 12 so that each winding has a surface in contact with an opening, or in other words that there will be some cooling contact for each winding so that heat may be dissipated therefrom without needing to pass through the insulation and other high thermal resistance elements existing between windings, and without excessively enlarging the coil. For even larger coils, in order to minimize the increase in coil size resulting from practicing the teachings of this invention, it may be necessary to have several windings between each adjacent pair of openings 12. Further, while only a single layer of a coil is shown in the figures, the coil will generally be several layers thick, with the openings extending through all layers of the coil.

Figure 2:
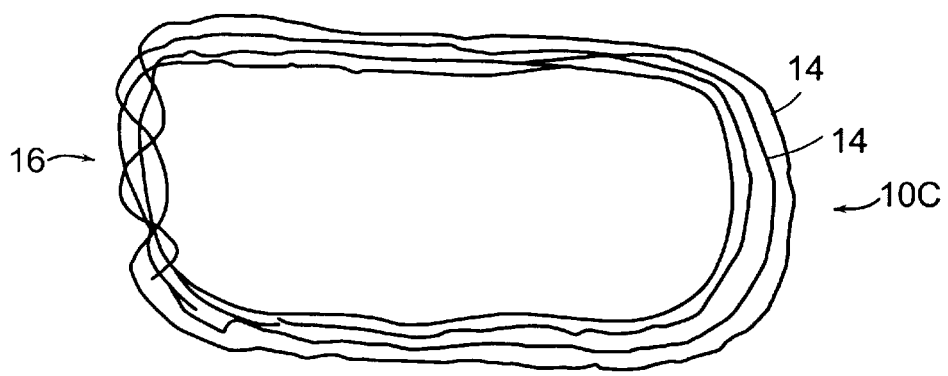
FIG. 2 is a top view of a coil having openings formed therein on one side for an alternative embodiment of the invention.

FIG. 2 shows a coil 10C which differs from the coils previously described in that, instead of openings 12 being formed through the windings at a selected region 16 along the coil, for example at its end, the required openings are formed by randomly or loosely winding wires 14 in selected non-working region 16, for example at one end of the coil, to form a series of openings, or to render the coil porous in this region. This configuration will be more ideally suited to some embodiments for utilizing the coils than to others.

Figure 3:
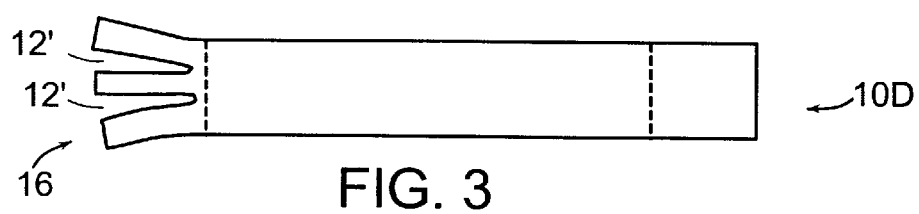
FIG. 3 is a side view of a coil having openings formed on one side thereof for another alternative embodiment.

FIG. 3 illustrates a coil 10D for another alternative embodiment of the invention wherein the openings 12' between adjacent windings in the region 16 are substantially parallel to the plan of the windings rather than perpendicular thereto. As may be seen from FIG. 3, this results in a flaring of the coil at the region 16 where the openings 12' are formed. As for the openings 12 of FIGS. 1A and 1B, openings 12' may be formed between each adjacent pair of windings, there may be two windings between the openings for embodiments with larger coils, or there may be more windings provided between adjacent openings, particularly for much larger coils, to avoid excess flaring of the coil in the region 16. While in both FIG. 2 and FIG. 3, only a single region 16 has been shown where openings are formed, two or more non-working regions 16 having openings could be provided for each of these embodiments. It is also within the contemplation of the invention, although generally not preferred, that openings from two different embodiments might be employed on the same coil, for example the openings 12 of FIG. 1A on one side of the coil and openings formed by a loose winding such as that shown in FIG. 2 on the other side of the coil.

Figure 4:
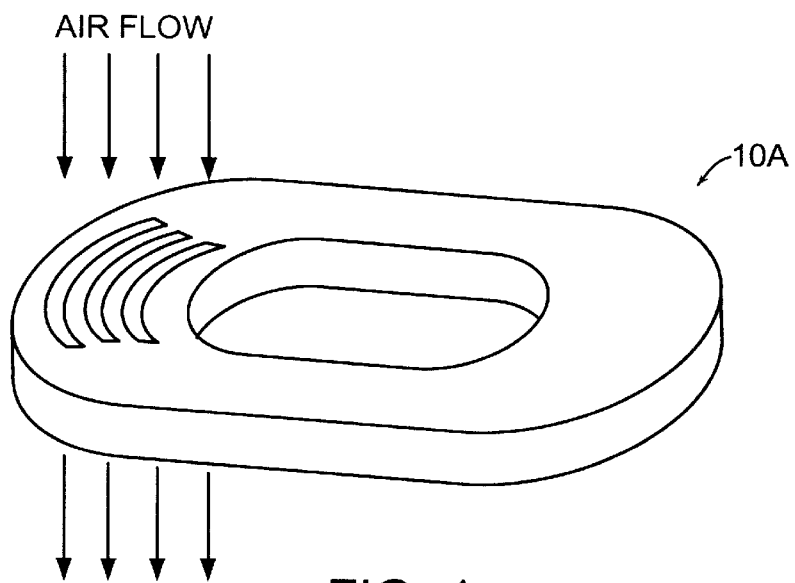
FIG. 4 is a schematic perspective view illustrating a coil with openings in accordance with the teachings of this invention having air flowed therethrough.

The coils shown in FIGS. 1A–3 can, in the simplest case, be utilized to reduce coil heating by merely having an enhanced area of the wires exposed to air or other ambient environment from which heat may be dissipated or sinked into such environment. Such environment could be air or some other gas, or could be oil, water or some other liquid. In this discussion, gases and liquids are sometimes collectively referred to as "fluids." A static fluid in the openings will remove more heat from the coil than would be the case if there were no openings in the coil, and heat dissipation is generally further enhanced by natural convection of the fluid in the openings. This natural convection is driven by the heat dissipated in the coil and causes a passive flow of fluid through the openings. FIG. 4 illustrates another option where air is actively driven through the openings 12 of a coil 10A. Such active air flow may be achieved by use of a fan, blower or other mechanism known in the art. Further, while a coil 10A is shown in FIG. 4 and in the subsequent figures for purposes of illustration, a coil 10B–10D or other coil having openings formed therein might also be utilized for most of these embodiments.

Figure 5:
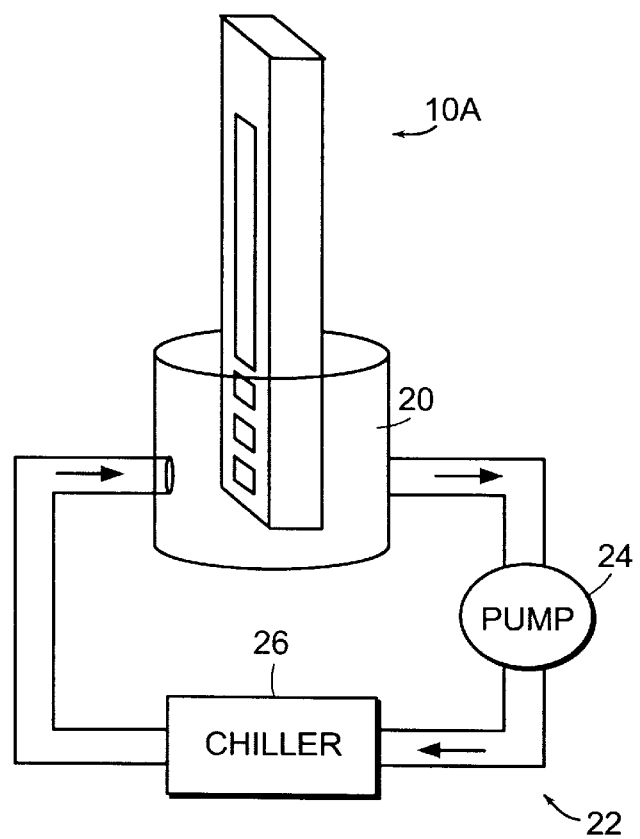
FIG. 5 is a semi-schematic diagram of a system providing for liquid flow through a coil formed in accordance with the teachings of this invention.

FIG. 5 illustrates another embodiment of the invention wherein coil 10A is immersed in a liquid bath 20. The liquid is circulated through bath 20 and through a closed recirculation loop 22 by a pump 24. A chiller 26 may be included in recirculation loop 22 for some applications, although this may often not be required. While water has better thermal properties than oil, for a given liquid flow at a given temperature is more effective in removing heat from the coil, and is cheaper, cleaner and more readily available than oil, water is, as discussed later, also electrically conductive and could therefore result in short circuits at any breaks or pinholes in the wire insulation. Oil is therefore the liquid generally used for coil cooling in either a passive or active liquid cooled system where the liquid directly contacts the coils, with water being used as the cooling liquid for other applications. If water is to be used for cooling the coil 10, it is preferable that the openings in the coil, for example the openings 12, be lined with a substantially water impervious material. This may be accomplished by for example inserting a metal or heat conducting plastic channel through the opening for water to flow through, but is preferably accomplished by coating the walls of the openings, and preferably at least the portion of the coil in contact with the liquid, with a heat conducting epoxy or other suitable material which protects the windings of the coil from shorting as a resulting of water seepage, while not having a significant adverse impact on the transfer of heat from the wires to the liquid. Since such a heat conducting epoxy transfers heat better than air, encapsulating the windings in such epoxy, at least in the region 16, also results in enhanced heat transfer from the coil, particularly for windings which may not be adjacent an opening. However, care must be taken not to fill in the openings when the coil is potted in epoxy. Where there is more than one region 16 for a coil, the flow path for the fluid may be through each of such regions and/or where the coil device has several coils, all or any subset of such coils may also be in the same flow path.

Figure 6:
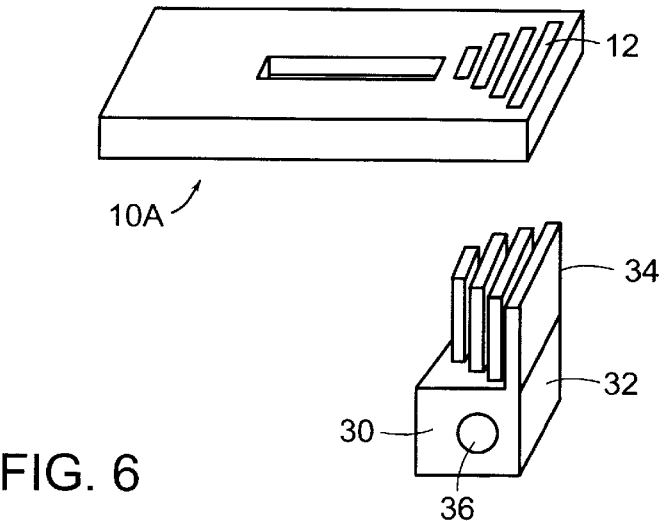
FIG. 6 is a partially exploded perspective view illustrating an alternative technique for cooling a coil in accordance with the teachings of this invention.
Figure 7:
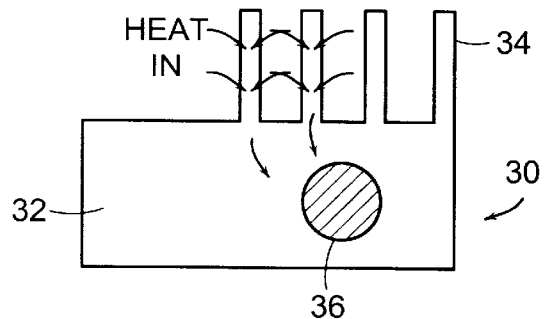
FIG. 7 is a side view of a comb structure suitable for use in practicing the embodiment of FIG. 6.

FIG. 6 illustrates an alternative embodiment for cooling a coil 10A having openings 12 formed therein. For this embodiment, a comb 30 is provided having a backbone or block 32 with a plurality of fingers 34 extending therefrom, there preferably being a finger 34 for each of the openings 12. Comb 30 is preferably formed of copper or of some other material having good heat conduction properties. An opening 36 extending through block 32 permits water or other suitable fluid to be circulated through the block, for example via a recirculation loop such as the loop 22 shown in FIG. 5. A pump 24 and an optional chiller 26 might also be used in such a loop. Except for the channel 36, block 32 and fingers 34 are preferably solid to provide optimum heat transfer. Each finger 34 fits in a corresponding opening 12 and the fingers 34 are preferably sized so as to be in substantial contact with the walls of such openings. To the extent this is not possible, the assembly, including fingers 34, may be encapsulated with a heat conducting epoxy, or another suitable heat conducting material may be injected or otherwise caused to fill any spaces between fingers 34 and the walls of openings 12 so as to facilitate good heat transfer between windings 14 and fingers 34. As illustrated in FIG. 7, heat absorbed by the fingers flows through block 32 to the cooling fluid flowing through channel 36, thus cooling the windings.

Figure 8:
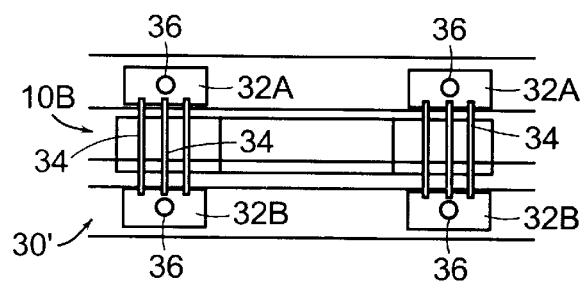
FIG. 8 is a semi-schematic side sectional view of an alternative implementation for the embodiment of FIG. 6.

FIG. 8 illustrates an alternative embodiment wherein there are two combs 30', one on each side of a coil 10B having openings 12 on each side thereof, each of the combs 30' having fingers 34 which are connected at one end to a block 32A and at the other end to a block 32B, at least one and preferably both blocks 32A, 32B of each comb have water or another suitable fluid flowing through a channel 36 formed therein. For this embodiment of the invention, heat entering fingers 34 from the windings may thus flow in two directions to a heat sink block 32, thereby enhancing heat dissipation. Further, while in the discussion so far it has been assumed that fingers 34 are solid, fingers 34 could also be hollow, permitting fluid for example to flow in through channel 36 of block 32A, through fingers 34, and out through channel 36 of block 32B. Such flowing fluids could further enhance heat removal from the appropriate coil 10.

Figure 9:
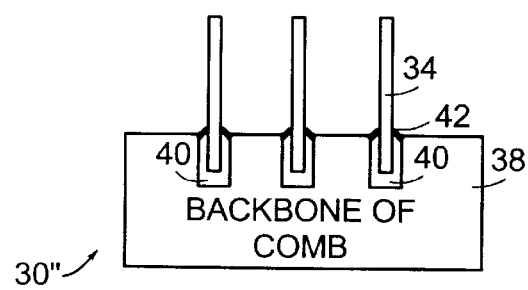
FIG. 9 is a side view illustrating an alternative comb structure suitable for use in for example the embodiment of FIG. 6.

FIG. 9 shows still another embodiment of the invention wherein the block or backbone of a comb 30" has a channel 40 formed therethrough for each finger 34. Each finger 34 is sealed in the corresponding channel 40 by a seal 42, which seal may for example be an epoxy or other suitable sealing material and which seal need not be heat conductive. Water or other suitable fluid is flowed through the channels 40 to cool fingers 34. Alternatively, a single channel may be provided through backbone 38 which extends through the center of the backbone from for example left to right as viewed in FIG. 9, and into which single channel each of the fingers 34 extend. With either of these arrangements, heat is removed directly from the fingers by the flowing fluid rather than indirectly from the fingers through the block or backbone 32 as for the prior embodiment, thus overcoming the problem with these prior embodiments of obtaining a good thermal connection between the fingers and backbone, the temperature rise across the backbone itself and to the coolant being negligible.

While a flowing fluid could be utilized to cool the coil of FIG. 2 in the manner shown for example in FIG. 4 or FIG. 5, this coil configuration does not lend itself readily to cooling using a comb structure, for example as shown in FIGS. 6–9. However, it is possible that a suitable comb structure could be developed for use with this coil. The coil of FIG. 3 may however be used with a flowing fluid, or with a comb structure. Fingers of the comb can be shaped for example to extend over an entire end of coil 10D. Further, the fingers can be positioned in the coil as it is being wound to form the openings 12, with the fingers subsequently being soldered, welded or otherwise attached to backbone or block 32, or sealed in backbone 38. In some applications, it may also be possible to have a block or backbone inside of coil 10D from which fingers 34 extend, which backbone may or may not have a cooling fluid flowed therethrough depending on space and other considerations. With this arrangement, a block/backbone may also be attached on the outside of the coil to provide a comb having blocks on both sides of the fingers in an arrangement similar to that of FIG. 8, but rotated 90 degrees. For all of the comb embodiments, it is preferred to wind the coil around the fingers as this ensures a close contact between the wires and fingers. Inserting the fingers after the coil has been wound requires larger gaps between fingers and wires and might also nick the wire.

Figure 10:
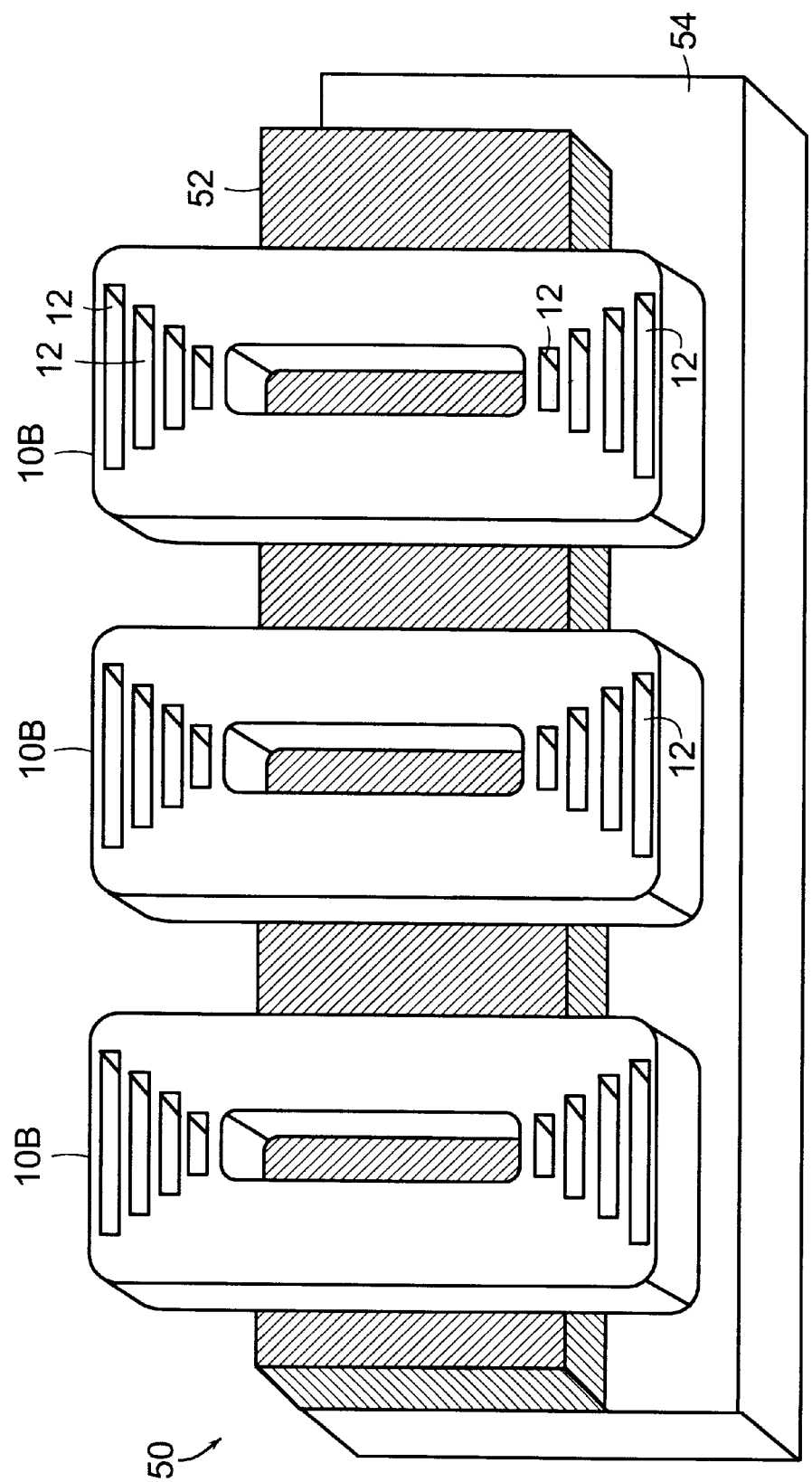
FIG. 10 is a schematic perspective view of a linear motor utilizing the cooled coils of this invention.

FIG. 10 is a schematic representation of a linear motor 50 using three coils 10B. The working portion of each of the coils overlies magnets 52 which are mounted to back iron 54. The ends of the coils have openings 12 formed therein which may be utilized for cooling the coils using one of techniques previously described.

Many factors influence the increased power output/current flow capacity which can be obtained utilizing the teachings of this invention. For all embodiments, performance will be influenced by the coolant utilized and by the flow rate of the coolant. In particular, water has twice the heat capacity of oil and 4.5 times the thermal conductivity. Therefore, a water-cooled coil needs only half the flow rate of coolant as an oil-cooled coil to carry away the same amount of heat at a given temperature rise. Both liquids have significantly better heat transfer properties than air. Water is also less viscous than oil so it is easier to develop a turbulent flow, which flow is known to improve heat transfer over laminar flow. Water is also more generally available and easier to work with.

Therefore, for embodiments, such as that shown in FIGS. 6–9 where the flowing fluid does not come in contact with the coils, water would generally be employed as the flowing coolant. Chilled water might be used in some applications. However, since water can seep into even pin holes in the coil insulation, creating corrosion or a short circuit, as indicated earlier, water cannot generally be used in an embodiment such as that shown in FIG. 5 unless the coil, including the openings 12, has been properly lined to protect against such seepage. In such cases, oil might be utilized as the coolant, or possibly even air, assuming optimum cooling was not required.

Flow rate is also a factor in cooling, particularly for embodiments such as those shown in FIGS. 4 and 5. However, flow rate requirements present a conflict in that, while a high rate of fluid flow through the openings improves heat dissipation, and larger openings are desirable for permitting such high flow rate without excessive pressure, with such large openings the thermal boundary layer in the fluid in the openings is thicker which reduces heat transfer efficiency. Smaller openings reduce the thickness of this boundary layer which increases the temperature gradient across the fluid thus improving heat transfer. Thus, while it is preferred to make the openings smaller so that the end-turn size is smaller and heat transfer is improved, the pressure required to pump fluid through these openings increases as the fourth power of the gap. This places a lower limit on the opening size. The optimum opening size and flow rate for a given coil may therefore need to be empirically determined.

Another factor in determining performance is the size and shape of the coil 10. While the cooling at non-working region 16 can be controlled by adjusting the size of the region 16 to the extent possible, the size of openings 12, the coolant utilized, the fluid volume and velocity and other factors, there is less control over the heat transfer from portions of the coil outside of region 16, i.e. working regions, to this region. Therefore the temperature rise in the coil needs to be modeled as consisting of two distinct regions. In Region I (the region(s) outside region(s) 16), there is no cooling and in Region II (i.e., region(s) 16) the coil is separated and cooled by one of the several techniques discussed above. In Region I, heat is generated along the coil and flows through wires 14 towards Region II. The temperature rise across Region I goes as its length squared as would be expected from heat transfer theory. In Region II, heat is generated along the coil and also removed by, for example, a flowing liquid. The temperature rise across this region is predicted by the standard analysis of a fin in heat transfer theory. [Anthony F. Mills. Basic Heat and Mass Transfer, Irwin: Boston, Ma., 1995.] Note that even if the cooling mechanism is extremely efficient, Region II temperature drop is only a few degrees C, so that if Region I is very long, its temperature rise could be quite high, thus causing the coil to overheat even with efficient cooling. Thus, the coil geometry must be carefully matched to the cooling system for optimal operation in order to achieve significant improvement in the current carrying capacity of the coil. Thus, for a long coil, coil configuration 10B having openings on both ends of the coil may be required. Depending on coil size and shape, and the cooling techniques utilized, one, two, or even more regions 16 with openings formed therein may be required for a given application. In some applications, providing cooling on both ends of the coil as is shown for example in FIG. 1B may double the current carrying capacity of the coil over a coil cooled on only one end as shown in FIG. 1A.

While the actual improvement in current carrying capacity will vary significantly with the various factors and techniques indicated above, significant increases in current carry capacity for the same temperature rise can be easily achieved using the teachings of this invention and a nearly sixfold increase in current carrying capacity for a given temperature rise of 100° C. has been experimentally demonstrated for a coil like that shown in FIG. 1B cooled directly with oil on both end-turns as generally shown in FIG. 5 for a single end-turn. Thus, this cooling technique has demonstrated nearly six times higher force in a linear motor in steady state, while dissipating 32 times the heat of a free convection cooled coil (since heat dissipated goes as current squared).

Another benefit of the improved cooling scheme is that the time constant for a hot coil to cool to room temperature is drastically reduced, by a factor of about 60 in the experiments. This is a consequence of the fact that with separated end-turns, the heat has a direct path out of the coil.

Coils such as coils 10A and 10B can be fabricated in a variety of ways. One way is to provide shims or fingers on a winding block as the coil is being wound, with the shims being added as the wrapping of the windings fitting thereunder are complete. Pins may be utilized in lieu of the shims to achieve the same objective. After it is wound, the coil is bonded by passing a current through it. The current causes heating which hardens the thermoplastic bond coat and causes the wire to hold its shape. Once the winding has been bonded, the shims/pins are removed. The windings may be encapsulated with a suitable material, for example a heat conducting epoxy, either before or after the shims/pins are removed in order to have the coil retain a desired shape.

Since such coating can also enhance heat transfer between adjacent windings and protect against water seepage into the windings, such encapsulation is generally desirable. As indicated previously, the coil 10D of FIG. 3 could be more easily fabricated since the shims can be more easily positioned before winding begins and do not need to be added during the course of the winding process.

While the above has discussed preferred embodiments, and various modifications thereof, it is apparent that the specific coil configurations shown in the figures, and the various cooling techniques employing such coils are but examples of coils and cooling techniques available utilizing the teachings of this invention and that other coil configurations and techniques for effecting cooling of such coils could be employed depending on application. Further, while a linear motor application has been shown, and this is a preferred application, the coils and coil devices may also be used in other appropriate applications including other electric motors, generators, electromagnets, some transformers, etc. Thus, while the invention has been particularly shown and described above with respect to various preferred embodiments, the foregoing and other changes in form and detail may be made therein by one skilled in the art while still remaining within the spirit and scope of the invention, which is to be defined only by the appended claims.

What is claimed is:

1. Apparatus for cooling a current carrying coil having a plurality of wires wrapped in a particular shape, which coil has at least one working region and at least one non-working region, including:
    openings formed in said coil between at least selected internal wires, said openings being substantially limited to at least one said non-working region; and
    a heat sink in each said openings, said heat sink being one of (a) a liquid and (b) a comb formed of a material having good heat conduction characteristics, said comb having a plurality of fingers, which pass through corresponding said openings.

2. Apparatus as claimed in claim 1 wherein said liquid is an oil.

3. Apparatus as claimed in claim 1 wherein said liquid is water.

4. Apparatus as claimed in claim 1 wherein said liquid flows through said openings and including a recirculation mechanism for said liquid.

5. Apparatus as claimed in claim 4 wherein said recirculation mechanism includes a chiller for said liquid.

6. Apparatus as claimed in claim 1 including a protective lining for said openings, to at least limit contact of the liquid with said wires.

7. Apparatus as claimed in claim 1 wherein said heat sink is a liquid flowing through said openings.

8. Apparatus as claimed in claim 1 wherein said coil is elongated, having two long side sections connected by two shorter end sections, and wherein said at least one non-working region having openings formed therein is in at least one of said end sections.

9. Apparatus as claimed in claim 8 wherein there is a said non-working region where openings are formed in the coil at both end sections of the coil.

10. Apparatus as claimed in claim 1 wherein the number of said openings and their positioning at the at least one non-working region is such that each said wire which is internal to the coil is adjacent at least one said opening.

11. Apparatus as claimed in claim 1 wherein said heat sink is said comb, said comb having a block to which said fingers are thermally connected, and including a heat sink element which removes heat from said block.

12. Apparatus as claimed in claim 11 wherein said heat sink element includes a mechanism passing cooling liquid through said block.

13. Apparatus as claimed in claim 11 wherein said comb includes a block on each side of the corresponding openings, the fingers passing through the opening and being thermally connected to the blocks on both sides of the openings.

14. Apparatus as claimed in claim 13 wherein said fingers are hollow, and wherein said heat sink element includes a mechanism which passes a cooling liquid into one of said blocks, through said fingers and out through the other of said blocks.

15. Apparatus as claimed in claim 11 wherein said comb has a block with at least one channel passing therethrough, each said finger passing through one side of the block and into a said at least one channel, and including a mechanism which passes a cooling fluid through said at least one channel and over portions of said fingers extending therein.

16. Apparatus as claimed in claim 11 including a thermally conductive material in any gaps between said wires and said fingers.

17. Apparatus as claimed in claim 1 wherein said coil is loosely wound in said at least one non-working region to form said openings.

18. Apparatus as claimed in claim 1 wherein said openings are substantially perpendicular to the plane of said coil.

19. Apparatus as claimed in claim 1 wherein said openings are substantially parallel to the plane of said coil.

20. A coil adapted for use in a coil device which coil has at least one working region and at least one non-working region, including:
    a plurality of wires wrapped in a particular shape to form said coil, and openings formed in said coil between at least selected internal wires of said coil, said openings being substantially limited to at least one non-working region along said coil and extending through the coil in a direction which is one of substantially perpendicular to a plane of said coil and substantially parallel to said plane.

21. A coil as claimed in claim 20 wherein the number of said openings and their positioning in the at least one non-working region are such that each said wire which is internal to the coil is adjacent at least one said opening.

22. A coil as claimed in claim 20 wherein said coil is elongated, having two long side sections connected by two shorter end sections, and wherein said at least one non-working region is in at least one of said end sections.

23. A coil as claimed in claim 20 including a protective lining for said openings.

24. A coil as claimed in claim 23 including a heat conducting substantially water-proof coating on said wires in at least said at least one non-working region.

25. A method of cooling a current carrying coil having a plurality of wires wrapped in a particular shape, which coil has at least one working region and at least one non-working region, including:
    providing openings in said coil between at least selected internal wires of the coil, said openings being substantially limited to at least one non-working region; and
    utilizing said openings to remove heat from said wires by one of (a) flowing a cooling liquid through said openings at least during periods that current is applied to said coil and (b) providing a comb having a block with fingers extending therefrom, positioning said fingers in each said opening to sink heat from said wires, and utilizing said block to sink heat from said fingers.

26. A method as claimed in claim 25 wherein said step of sinking heat from the fingers by providing a comb includes flowing a cooling fluid through said block.

27. A linear motor including:

at least one magnet array;

at least one elongated coil having working regions overlying said magnet array, but spaced therefrom by a gap, and at least one non-working region extending beyond said magnet array and not significantly interacting therewith, openings being formed in at least one said non-working region between at least selected internal wires of the coil; and a heat sink in each said openings, said heat sink being one of (a) a liquid in said openings; and (b) a comb formed of a material having good heat conduction characteristics, said comb having a plurality of fingers, which pass through corresponding said openings.

28. A linear motor as claimed in claim 27 wherein said liquid is flowing through said openings.

29. A linear motor as claimed in claim 27 wherein said coil is elongated, having two long side sections connected by two shorter end sections, and wherein said at least one non-working region having openings formed therein is in at least one of said end sections.

30. A linear motor as claimed in claim 27 wherein there is a said non-working region where openings are formed in the coil at both end sections of the coil.

* * * * *